United States Patent
Smith et al.

(10) Patent No.: US 9,260,629 B2
(45) Date of Patent: Feb. 16, 2016

(54) HYDROPHOBIC COATING FOR COATED ARTICLE

(75) Inventors: Richard L. Smith, South Windsor, CT (US); Joshua A. Sheffel, Manchester, CT (US); Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 872 days.

(21) Appl. No.: 12/874,677

(22) Filed: Sep. 2, 2010

(65) Prior Publication Data

US 2012/0058330 A1  Mar. 8, 2012

(51) Int. Cl.
- C09D 183/04 (2006.01)
- C08L 83/00 (2006.01)
- C08K 3/36 (2006.01)
- C08L 83/04 (2006.01)

(52) U.S. Cl.
CPC ........... *C09D 183/04* (2013.01); *C08K 3/36* (2013.01); *C08L 83/04* (2013.01); *C08L 2205/02* (2013.01); *Y10T 428/254* (2015.01); *Y10T 428/259* (2015.01)

(58) Field of Classification Search
None
See application file for complete search history.

(56) References Cited

U.S. PATENT DOCUMENTS

| | | |
|---|---|---|
| 3,579,540 A | 5/1971 | Ohlhausen |
| 3,986,997 A | 10/1976 | Clark |
| 4,151,327 A | 4/1979 | Lawton |
| 4,983,459 A | 1/1991 | Franz et al. |
| 4,997,684 A | 3/1991 | Franz et al. |
| 5,071,709 A | 12/1991 | Berquier et al. |
| 5,324,566 A | 6/1994 | Ogawa et al. |
| 5,328,768 A | 7/1994 | Goodwin |
| 5,360,851 A | 11/1994 | Feder et al. |
| 5,425,804 A | 6/1995 | Shinohara et al. |
| 5,449,712 A | 9/1995 | Gierke et al. |
| 5,523,161 A | 6/1996 | Goodwin |
| 5,523,162 A | 6/1996 | Franz et al. |
| 5,571,622 A | 11/1996 | Ogawa et al. |
| 5,747,561 A * | 5/1998 | Smirnov et al. ............... 523/212 |
| 5,800,918 A | 9/1998 | Chartier et al. |
| 5,840,800 A | 11/1998 | Joffre et al. |
| 5,889,086 A | 3/1999 | Ushijima et al. |
| 5,997,943 A | 12/1999 | Azzopardi et al. |
| 6,001,485 A | 12/1999 | Kobayashi et al. |
| 6,025,025 A | 2/2000 | Bartrug et al. |
| 6,099,971 A | 8/2000 | Faris et al. |

(Continued)

FOREIGN PATENT DOCUMENTS

| | | |
|---|---|---|
| EP | 0381376 | 8/1990 |
| EP | 0430156 | 11/1990 |

(Continued)

OTHER PUBLICATIONS

Cao, Anti-Icing Superhydrophobic Coatings, Langmui Letter, XXXX American Chemical Society, Web Publication Date Oct. 5, 2009.

(Continued)

*Primary Examiner* — Kenneth Stachel
(74) *Attorney, Agent, or Firm* — Carlson, Gaskey & Olds, P.C.

(57) ABSTRACT

A coated article includes a substrate and a superhydrophobic coating on the substrate. The superhydrophobic coating is a composite of a silicone polymer and particles that are inherently hydrophobic or surface-functionalized with a hydrophobic agent.

24 Claims, 1 Drawing Sheet

(56) References Cited

U.S. PATENT DOCUMENTS

| | | | |
|---|---|---|---|
| 6,340,502 B1 | 1/2002 | Azzapardi et al. | |
| 6,743,467 B1 | 6/2004 | Jones et al. | |
| 7,344,783 B2 | 3/2008 | Shea | |
| 2002/0082329 A1 | 6/2002 | Arora et al. | |
| 2006/0147829 A1 | 7/2006 | Huang et al. | |
| 2006/0172641 A1 | 8/2006 | Hennige et al. | |
| 2006/0263516 A1 | 11/2006 | Jones et al. | |
| 2007/0009657 A1 | 1/2007 | Zhang et al. | |
| 2007/0218265 A1 | 9/2007 | Harris et al. | |
| 2007/0241303 A1* | 10/2007 | Zhong et al. | 252/62.3 T |
| 2007/0254170 A1 | 11/2007 | Hoover et al. | |
| 2007/0298216 A1* | 12/2007 | Jing et al. | 428/141 |
| 2008/0160257 A1 | 7/2008 | Takada et al. | |
| 2009/0104347 A1 | 4/2009 | Van Benthem et al. | |
| 2009/0136741 A1 | 5/2009 | Zhang et al. | |
| 2009/0298369 A1 | 12/2009 | Koene et al. | |
| 2010/0004373 A1 | 1/2010 | Zhu et al. | |
| 2010/0022107 A1 | 1/2010 | Hou et al. | |
| 2010/0040867 A1 | 2/2010 | Manca et al. | |
| 2010/0042191 A1 | 2/2010 | Squeri | |
| 2010/0126981 A1* | 5/2010 | Heintz et al. | 219/482 |
| 2011/0084421 A1* | 4/2011 | Soane et al. | 264/219 |

FOREIGN PATENT DOCUMENTS

| | | |
|---|---|---|
| EP | 0881269 | 12/1998 |
| EP | 1186640 | 3/2002 |
| EP | 2130878 | 12/2009 |
| JP | 51000391 | 1/1976 |
| JP | 59003170 | 1/1984 |
| JP | 5001391 | 1/1993 |
| JP | 5093170 | 4/1993 |
| JP | 6092621 | 4/1994 |
| JP | 10013302 | 1/1998 |
| WO | 20050068400 | 7/2005 |
| WO | WO 2007052260 A2 * | 5/2007 |
| WO | 2008153687 | 12/2008 |
| WO | 2009125202 | 10/2009 |
| WO | 2010022107 | 2/2010 |
| WO | 2010042191 | 4/2010 |

OTHER PUBLICATIONS

Kulinich, Ice Adhesion on Super-Hydrophobic Surfaces, Applied Surface Science, Crown Copyright, 2009 Published by Elsevier.

European Search Reported received Nov. 22, 2011.

* cited by examiner

HYDROPHOBIC COATING FOR COATED ARTICLE

BACKGROUND

This disclosure relates to anti-icing or icephobic coatings for reducing ice and water formation or accumulation on a surface.

Surfaces of aircraft, power generation (e.g. wind turbines and land-based gas turbines), and architectural components may collect moisture that can freeze and debit the performance of the component. The component may include an anti-icing or icephobic coating to reduce ice accumulation by reducing adhesion between the ice and the coating. In operation of the component, sheer loads from drag, wind, or other forces exceed the adhesive strength and shed the accumulated ice.

SUMMARY

An example coated article includes a substrate and a superhydrophobic coating on the substrate. The superhydrophobic coating is a composite of a silicone polymer and particles that are inherently hydrophobic or surface-functionalized with a hydrophobic agent.

In another aspect, the superhydrophobic coating is a composite of a silicone polymer and at least two different kinds of hydrophobic particles.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
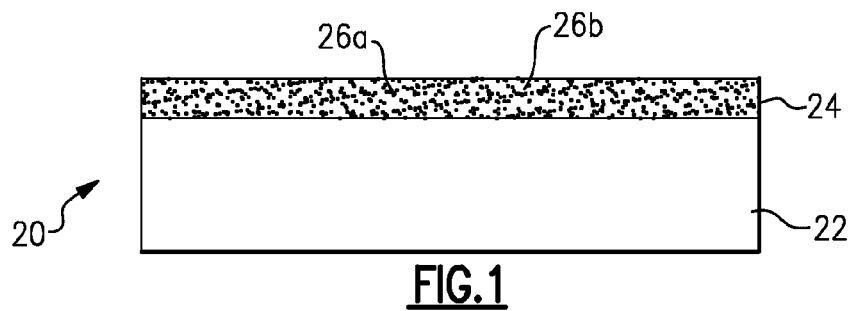
FIG. 1 illustrates an example coated article.

FIG. 1 illustrates selected portions of an example coated article 20 having anti-icing or icephobic properties. It is to be understood that the coated article 20 may be any type of component that would benefit from anti-icing. For instance, the coated article 20 may be an aircraft component, aerospace component, heat exchanger component, wind turbine component or any other component where there is a desire to reduce or eliminate ice formation.

The coated article 20 generally includes a substrate 22 and a superhydrophobic coating 24 on the substrate 22. The term "superhydrophobic" and variations thereof refers to an advancing water contact angle that is greater than 140° and a receding water contact angle that is within 20% of the advancing water contact angle. In the illustrated embodiment, the superhydrophobic coating 24 is located on the surface of the substrate 22 exposed to the surrounding environment to protect the substrate 22 from ice formation. The substrate 22 may comprise any material to which the superhydrophobic coating 24 may adhere, including metal alloys (e.g. alloys based on the metals aluminum, titanium, nickel, cobalt, iron, etc.), polymers, polymer blends, ceramics, glasses, and/or composites and combinations thereof. In comparison to icephobic coatings that address anti-icing via reducing ice adhesion strength, the superhydrophobic coatings of the present disclosure are designed to shed water and thereby avoid ice formation. The superhydrophobic coating 24 may be considered to be an anti-icing or icephobic coating and may reduce or inhibit ice accumulation on the substrate by retarding or preventing the nucleation or formation of ice. The superhydrophobic coating 24 is designed to be compatible with or stable to intermittent or extended exposures at elevated temperatures (up to ~550° F.), such as might be encountered in certain aerospace components. The superhydrophobic coating 24 is further designed to be simple to apply. In the simplest embodiment the superhydrophobic coating 24 is applied to the substrate 22 as a single layer in one deposition step (e.g. a single spray coating, flow coating, dip coating, etc. application), although certain attributes may also be attained through a multi-step or multi-layer application process.

The superhydrophobic coating 24 is a composite of a silicone polymer 26a (e.g., matrix) and hydrophobic particles 26b (e.g., filler particles). The silicone polymer 26a may contain additives or processing aids, such as anti-foaming agents, pigments, dyes, stabilizers, and the like known to those practiced in the art. The silicone polymer may be a silicone, fluorosilicone, polysiloxane, room temperature vulcanized silicone, or other type of silicone composition or combination thereof. The particles 26b are inherently hydrophobic or surface-functionalized with a hydrophobic agent that renders the particle surfaces hydrophobic and contribute to the superhydrophobic properties of the coating 24.

The particles 26b may be nanosized particles. In one example, the particles 26b are monodisperse nanosized silica, such as fumed amorphous silica ($SiO_2$). Alternatively, the particles 26b may include combinations of different sized particles. Other suitable nanosized particles may include crystalline and amorphous oxides, non-oxide ceramics, metals and metal alloys, polymers and polymer blends, carbons, and metal hydroxides and oxide-hydroxides (such as natural and synthetic clays, mica, and diatomaceous earth). If the particles 26b are not inherently hydrophobic their surfaces may be rendered hydrophobic by surface functionalizing with an appropriate hydrophobic agent. The hydrophobic agent may be any type of agent that suitably bonds to the surfaces of the particles 26b and renders the particles hydrophobic. For example, the hydrophobic agent may be a functionalized silane coupling agent, polydimethylsiloxane, hexamethyldisilazane, octylsilane, dimethyldichlorosilane, or a combination thereof.

The composition of the superhydrophobic coating 24 may be characterized by a mass ratio of the silicone polymer 26a to the hydrophobic particles 26b. In one example, the mass ratio is between 0.5 and 3, and in some examples 0.5-1.5. In a further example, the superhydrophobic coating 24 may include only the silicone polymer 26a and the particles 26b. The use of nanosized hydrophobic particles 26b in combination with the silicone polymer 26a may render the coating 24 superhydrophobic. That is, the superhydrophobic coating 24 exhibits an advancing water contact angle that is greater than 140° and a receding water contact angle that is within 20% of the advancing water contact angle (i.e., a contact angle hysteresis that is less than 20%). A user may determine the advancing and receding water contact angles with known equipment and testing techniques, such as the Wilhelmy plate method or using a contact angle goniometer.

Figure 2:
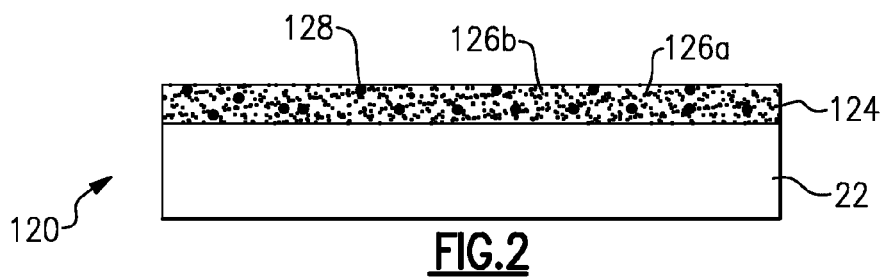
FIG. 2 illustrates another example coated article having at least two different kinds of hydrophobic particles.

FIG. 2 illustrates another example coated article 120. In this disclosure, like reference numerals designate like elements where appropriate, and reference numerals with the addition of one-hundred or multiples thereof designate modified elements that are understood to incorporate the same features and benefits of the corresponding original elements. In this case, the coated article 120 includes a superhydrophobic coating 124 on the substrate 22. The superhydrophobic coating 124 includes a silicone polymer 126a and particles 126b, as described with regard to FIG. 1. Additionally, the superhydrophobic coating 124 includes particles 128. That is, the superhydrophobic coating 124 includes at least two different kinds of hydrophobic particles, the particles 126b and the particles 128. The particles 126b and the particles 128 may differ in composition, size, morphology, or other characteristic.

In the illustrated example, the particles 126b may be nanosized hydrophobic particles, as described above, and the particles 128 may be microsized particles. The microsized particles 128 may be polymeric, such as silicone or polytetrafluoroethylene particles, and have a surface roughness on the nanometer scale (0.1-500 nanometers). The particles 128 cooperate with the particles 126b and the silicone polymer 126a to contribute to the superhydrophobic properties of the coating 124. In this regard, the particles 128 reduce the need to use high amounts of the particles 126b. Thus, the superhydrophobic coating 124 can include generally less of the particles 126b in comparison to a coating that does not include the particles 128 and maintain approximately the same or better hydrophobicity performance.

In one example, the superhydrophobic coating 124 includes a mass ratio of the silicone polymer 126a to the particles 126b that is 0.5-10 and a mass ratio of the microsized particles 128 to nanosized particles 126b that is 0-10, such as 0.1-10. In a more particular example, the mass ratio of silicone polymer 126a to particles 126b is 4-6 and the mass ratio of particles 128 to particles 126b is 0.3-2. Using surface functionalized nanosized silica particles as the particles 126b and microsized silicone particles as the particles 128 renders the coating 124 to be superhydrophobic.

The microsized particles may have a size of 1-100 micrometers, and in some examples 5-25 micrometers. The nanosized silica particles may have a size of 1-200 nanometers, and in some examples 1-50 nanometers. The microsized particles 128 may be regarded as a "roughening agent" to the silicone polymer 126a to enhance the surface roughness of the superhydrophobic coating 124 and enhance hydrophobicity.

Alternatively, the microsized particles 128 may be a ceramic, metallic, polymeric, or composite material having hydrophobic properties and a surface roughness on the nanometer scale (0.1-500 nanometers). Particles 128 may be inherently hydrophobic or surface-functionalized with a hydrophobic agent. Further, microsized particles that are not hydrophobic may also be suitable in certain coating formulations, if the microsized particles are sufficiently coated or wetted by the silicone matrix of the coating.

Utilizing at least two different kinds of particles in the superhydrophobic coating 124 also enhances the water durability of the superhydrophobic coating 124. Herein, water durability is defined as the ability of the superhydrophobic coating 124 to retain superhydrophobic surface properties (i.e. advancing contact angle >140° with less than 20% contact angle hysteresis) over prolonged immersion in liquid water.

Figure 3:
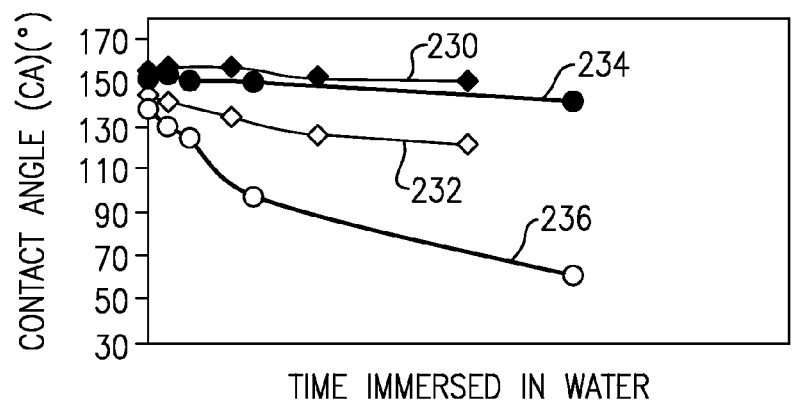
FIG. 3 illustrates a graph of water (deionized) contact angle versus time immersed in water.

FIG. 3 illustrates a graph of water contact angle versus time immersed in water. Sample 1 and sample 2 were prepared by depositing coatings of different compositions on substrates using a known dip coating technique and a suspension of silicone polymer (NUSIL R-2180) and nanosized silica particles (ALFA-AESAR), as described above, in methyl ethyl ketone. Sample 1 additionally included microsized silicone particles (TOSPEARL 1110A polydimethylsiloxane microspheres) as described above. The microsized silicone microspheres had an average size of approximately 11 micrometers and a relatively smooth surface morphology having a roughness on the nanometer scale. Samples 1 and 2 were aged by immersing the coated substrates in deionized water at ambient temperature.

The graph line 230 represents a plot of the advancing water contact angle of sample 1 as a function of time immersed, and the graph line 232 represents a plot of the receding water contact angle of sample number 1. Graph line 234 represents a plot of the advancing water contact angle of sample number 2 as a function of time immersed, and graph line 236 represents a plot of the receding water contact angle of sample number 2. The receding contact angle 236 of sample 2 declined substantially as a function of time immersed in the water. The receding contact angle 232 of sample 1 did not exhibit such a decline and suggests that the particles 128, such as the microsized silicone particles in sample 1, enhance water durability of superhydrophobic coatings.

Figure 4:
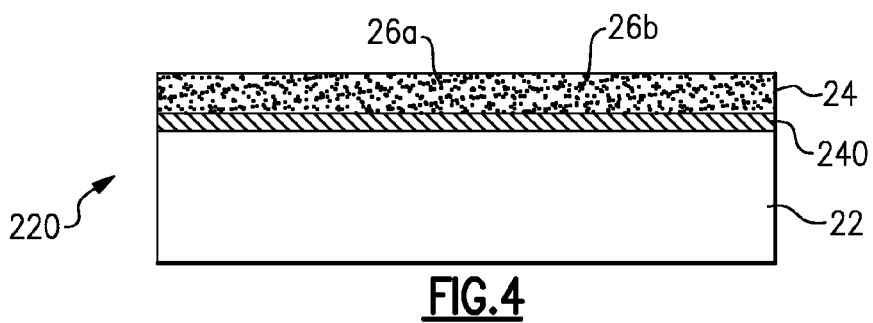
FIG. 4 illustrates another example coated article having a primer layer between a superhydrophobic coating and a substrate.

FIG. 4 illustrates another example coated article 220 that is similar to the coated article 20 of FIG. 1 but includes a primer layer 240 between the superhydrophobic coating 24 and the substrate 22. For instance, the primer layer 240 may be a metal-organic material that is adapted to bond to the superhydrophobic coating 24 and the material of the substrate 22.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A coated article comprising:
    a substrate; and
    a superhydrophobic coating on the substrate, and the superhydrophobic coating is a composite of a silicone polymer and particles that are hydrophobic or surface-functionalized with a hydrophobic agent, wherein the particles are nanosized silica particles, and the superhydrophobic coating includes a mass ratio of the silicone polymer to the particles that is 0.5-3.

2. The coated article as recited in claim 1, wherein the particles are surface-functionalized with the hydrophobic agent, and the hydrophobic agent is selected from the group consisting of silazanes, siloxanes, and combinations thereof.

3. The coated article as recited in claim 2, wherein the hydrophobic agent is polydimethylsiloxane.

4. The coated article as recited in claim 2, wherein the hydrophobic agent is hexamethyldisilazane.

5. The coated article as recited in claim 2, wherein the hydrophobic agent is octylsilane.

6. The coated article as recited in claim 2, wherein the hydrophobic agent is dimethyldichlorosilane.

7. The coated article as recited in claim 1, wherein the superhydrophobic coating consists essentially of the silicone polymer and the particles.

8. The coated article as recited in claim 1, wherein the silicone polymer is fluorosilicone.

9. The coated article as recited in claim 1, wherein the mass ratio of the silicone polymer to the particles is 0.5-1.5.

10. The coated article as recited in claim 1, wherein the particles are surface-functionalized with the hydrophobic agent, and the hydrophobic agent is siloxane.

11. The coated article as recited in claim 1, wherein the particles are surface-functionalized with the hydrophobic agent, and the hydrophobic agent is silazane.

12. The coated article as recited in claim 1, wherein the superhydrophobic coating consists of the silicone polymer and the particles.

13. A coated article comprising:
    a substrate; and
    a superhydrophobic coating on the substrate, and the superhydrophobic coating is a composite of a silicone polymer and at least two different kinds of hydrophobic particles, one of the at least two different kinds of hydrophobic particles including nanosized silica particles and another of the at least two different kinds of hydrophobic particles including microsized particles, the superhydrophobic coating including a mass ratio of the silicone polymer to the nanosized silica particles that is 4-6 and a mass ratio of the microsized particles to the nanosized particles is 0.3-2.

14. The coated article as recited in claim 13, wherein the at least two different kinds of hydrophobic particles include a first kind having a first composition and a second kind having a second composition that is different from the first composition.

15. The coated article as recited in claim 13, wherein at least one of the kinds of hydrophobic particles is surface-functionalized with a hydrophobic agent.

16. The coated article as recited in claim 15, wherein the hydrophobic agent is selected from the group consisting of functionalized silanes, silazanes, siloxanes, and combinations thereof.

17. The coated article as recited in claim 13, wherein the microsized particles include a polymer material.

18. The coated article as recited in claim 13, wherein the nanosized particles are silica and the microsized particles are silicone.

19. The coated article as recited in claim 13, wherein the microsized particles include a ceramic material.

20. The coated article as recited in claim 13, wherein the nanosized particles have an average size of 1-50 nanometers and the microsized particles have an average size of 5-25 micrometers.

21. The coated article as recited in claim 13, wherein the microsized particles include polydimethylsiloxane.

22. The coated article as recited in claim 13, wherein the superhydrophobic coating includes a mass ratio of the silicone polymer to the particles that is 0.5-10.

23. The coated article as recited in claim 22, wherein the mass ratio is 4-6 and the superhydrophobic coating has an advancing water contact angle greater than 140° and a receding water contact angle that is within 20% of the advancing water contact angle.

24. The coated article as recited in claim 13, wherein the microsized particles are metallic particles.

* * * * *